June 8, 1965     P. C. EPPLE     3,188,044
VEHICLE SEAT ADJUSTER
Filed Sept. 3, 1963     3 Sheets-Sheet 1
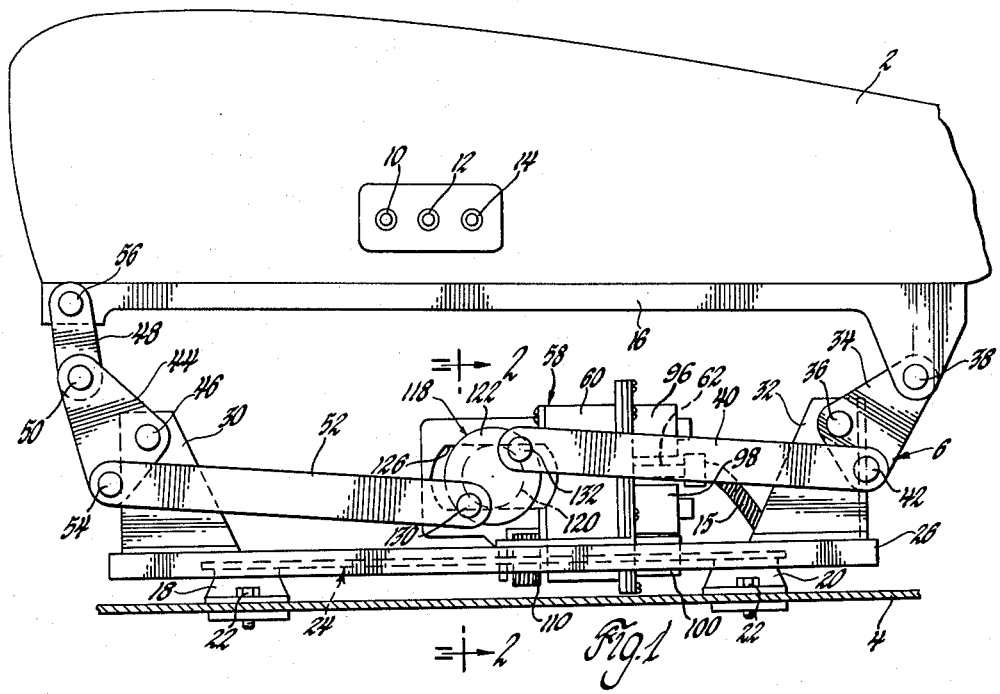
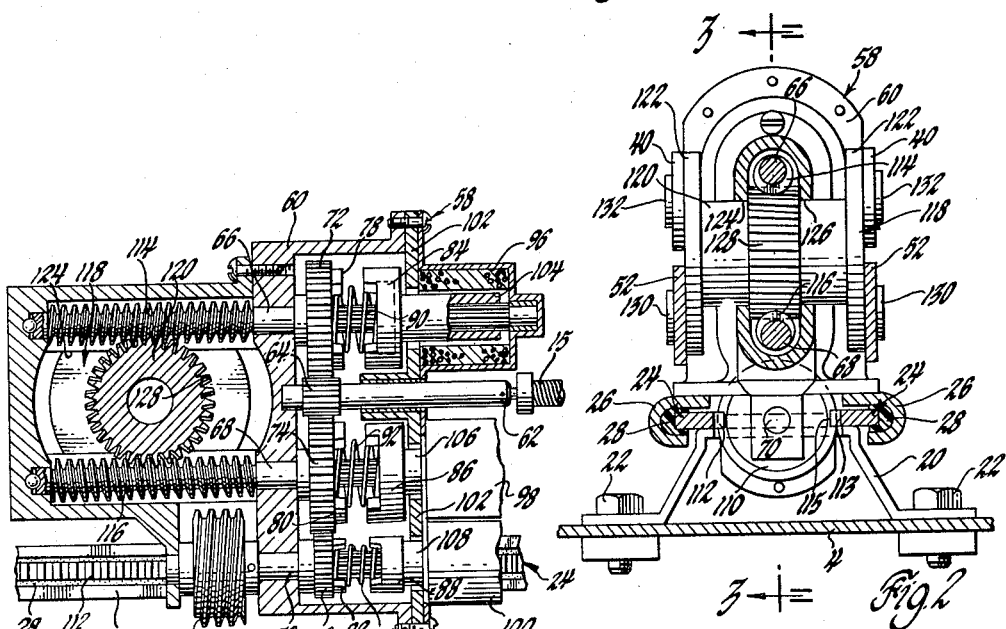
INVENTOR.
Peter Conrad Epple
BY
R. L. Spencer
ATTORNEY June 8, 1965  P. C. EPPLE  3,188,044
VEHICLE SEAT ADJUSTER
Filed Sept. 3, 1963  3 Sheets-Sheet 2
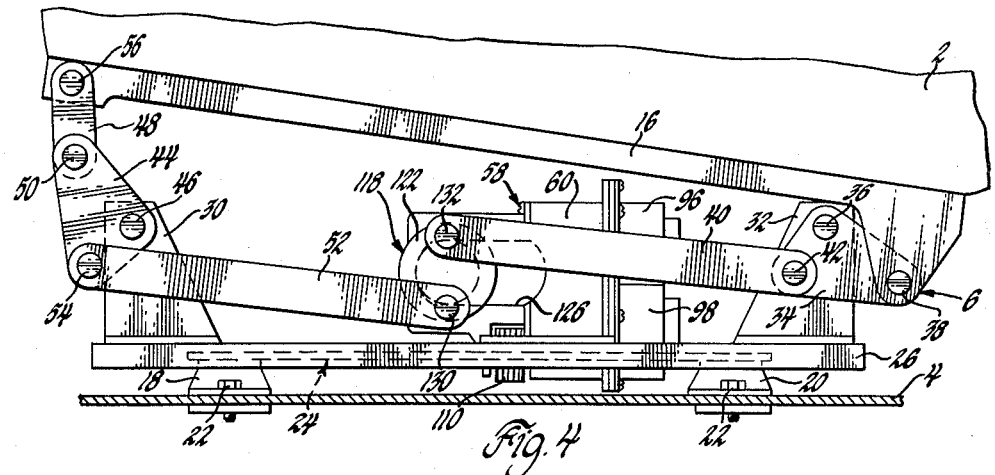
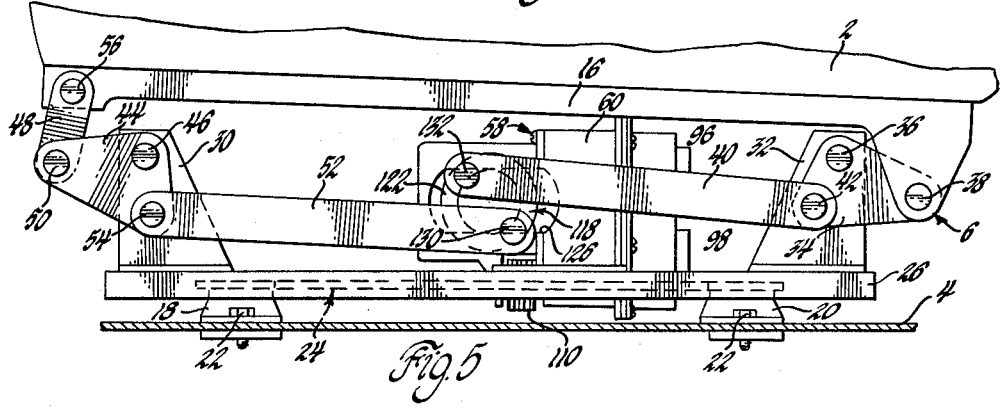
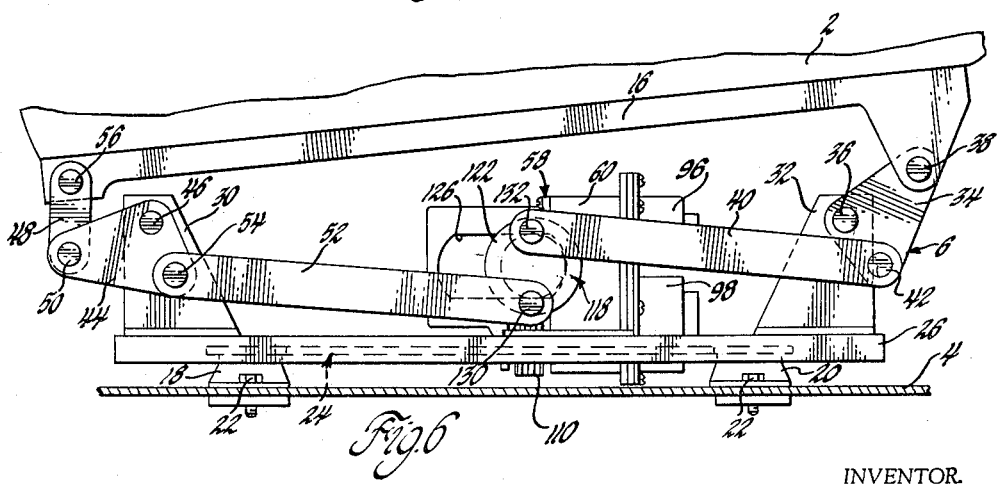
INVENTOR.
Peter Conrad Epple
BY
R. L. Spencer
ATTORNEY June 8, 1965 P. C. EPPLE 3,188,044
VEHICLE SEAT ADJUSTER Filed Sept. 3, 1963 3 Sheets-Sheet 3

INVENTOR.
Peter Conrad Epple
BY
R. L. Spencer
ATTORNEY

United States Patent Office 3,188,044
Patented June 8, 1965

3,188,044
VEHICLE SEAT ADJUSTER
Peter Conrad Epple, Detroit, Mich., assignor to General Motors Corporation, Detroit, Mich., a corporation of Delaware
Filed Sept. 3, 1963, Ser. No. 306,140
6 Claims. (Cl. 248—419)

This invention relates to a seat adjuster, and more particularly to a power actuated six-way seat adjuster.

The conventional six-way seat adjusters presently used in vehicles generally have a reversible electric motor operably connected to a transmission which has three flexible drive cables connected to each seat adjuster unit for horizontal, front vertical and rear vertical actuation. It is an object of this invention to provide a new and novel seat adjuster unit which is powered by a reversible electric motor with only one flexible drive cable running from the motor to the actuating means of each seat adjuster unit.

Generally, each actuating means for the front vertical, rear vertical and horizontal mechanism of the seat adjuster unit is powered by its own individual nut and jack screw or rack and pinion. It is another object of this invention to combine the two separate vertical systems into one system thereby eliminating one torque converting unit from each seat adjuster unit.

The basis of this new, novel actuating means is the fact that any point on a circular body such as a gear or wheel, excluding the center, when rotated in place about its center will describe a circle and when rotated about its center and rolled along its circumference in a straight line will describe a cycloid-curve, whereby links pivotally connected to the circular body will translate equivalent circular motions to varying lineal motions for actuating linkage systems. It is an object of this invention to provide a circular drive means which may be rotated in place about its center or rotated in such a manner that it moves along its periphery during rotation whereby the vertical linkage of the seat adjuster may be pivotally secured about the drive wheel in such a manner that rotation of the drive wheel will impart vertical adjustment to the linkages.

It is another object of this invention to provide a compact seat adjuster actuating device enclosed in a single housing and operably connected to a reversible electric motor by a single flexible drive cable for adjusting a vehicle seat horizontally, uniformly vertically or tiltingly vertically at either the front or rear of the seat.

It is another object of this invention to provide a combined actuator and transmission which may be joined with the horizontal track member in a stacked position between the vehicle seat and floor.

These and other objects will become more apparent as reference is had to the accompanying specification and drawings wherein:

FIGURE 1 is a side view of the novel seat adjuster supporting a vehicle seat on a vehicle floor, in the fully up position and showing the control switches mounted on the side of the seat.

FIGURE 2 is a view taken substantially along the line 2—2 of FIGURE 1 showing the cross-section of the unique actuating means mounted on the upper track of the adjuster unit.

FIGURE 3 is a view taken substantially along line 3—3 of FIGURE 2, with sections broken away, showing the relation of the solenoid actuated transmission gears to the worms and worm gear and the horizontal drive worm.

FIGURE 4 is the same view as FIGURE 1 with the front of the adjuster in the fully up position and the rear fully down.

FIGURE 5 is the same view as FIGURE 1 with the front and rear of the seat adjuster in the fully down position.

FIGURE 6 is the same view as FIGURE 1 with the front of the seat adjuster fully down and the rear fully up.

Figure 7:
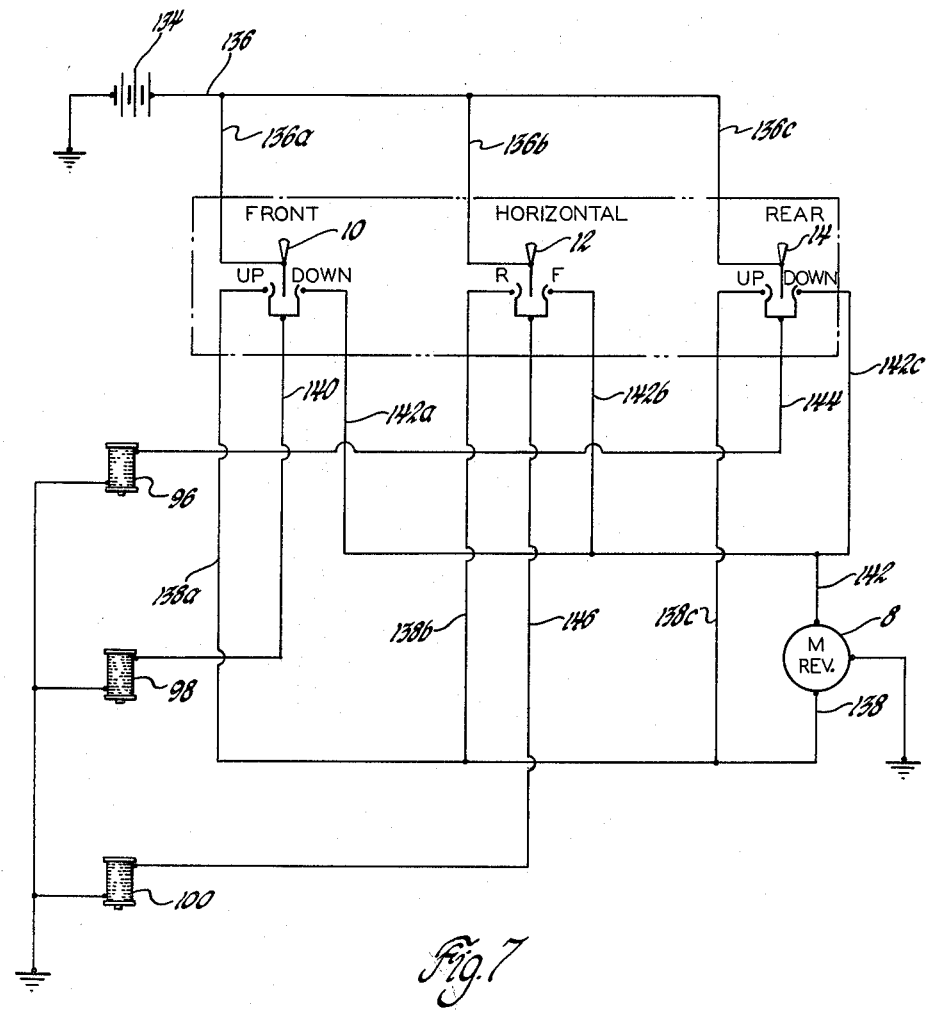
FIGURE 7 is a schematic diagram of the electrical control circuit for the seat adjuster.

A vehicle seat adjuster generally consists of two seat adjuster units extending longitudinally of a vehicle body and being transversally spaced in the vehicle body for supporting each end of a vehicle seat. Since the seat adjuster units are identical, except for being a right and left unit, only one is shown and described in detail.

Seat adjuster components are often fabricated from metal stampings and two parallel parts performing the same function are used for reasons of strength requirements. Where such parallel parts are shown in the drawings and referred to in the specification, identical identifying numbers will be used.

Referring now to the drawings, particularly FIGURES 1, 4, 5, 6 and 7, a vehicle seat 2 is supported on a vehicle floor 4 by a six-way seat adjuster unit, indicated generally by the numeral 6. The seat adjuster unit 6 is powered in a conventional manner by a reversible electric motor 8 actuated by control switches 10, 12, 14 which are used by the vehicle operator to control movement of the seat. Power is transmitted from the motor to the seat adjuster unit 6 by a flexible cable drive means 15. The seat adjuster unit 6 includes an upper support member 16 to which the vehicle seat 2 is secured and a pair of feet 18, 20 which support the seat adjuster unit at the front and rear, respectively, and are secured to the vehicle floor 4 by bolts 22. An elongated lower support member or lower track 24 is secured to the feet 18 and 20 by welding or other suitable means. An upper track member 26 having a generally "C" shaped cross-section is slidably connected to the lower track 24 by anti-friction bearing slugs 28, secured at intervals to the lower track 24, as best seen in FIGURE 2.

A pair of support arms 30, 32 are secured to the upper surface of the upper track 26 at the front and rear, respectively, for supporting the vertical linkages. A bell crank 34 has its fulcrum pivotally connected to support arm 32 by a pivot pin 36. One arm of the bell crank 34 is pivotally connected to the upper support member 16 by a pivot pin 38 and the other arm is pivotally connected to an actuating link 40 by a pivot pin 42. A second bell crank 44 has its fulcrum pivotally connected to the front support arm 30 by a pivot pin 46. One arm of the bell crank 44 is pivotally connected to a tie link 48 by a pivot pin 50 and the other arm is pivotally connected to an actuating link 52 by pivot pin 54. The tie link 48 is pivotally secured to the upper support member 16 by a pivot pin 56.

As best seen in FIGURES 1–3, the actuation mechanism for the seat adjuster unit 6, indicated generally by the numeral 58, is enclosed in a housing 60. Power from the reversible motor 8, shown schematically in FIGURE 7, is supplied to the actuation mechanism by the flexible cable 15 which is operably connected to a power input shaft 62 journaled for rotation in the housing 60. A pinion gear 64 is formed on shaft 62.

Three power output or delivery shafts 66, 68 and 70 having their axes parallel to the axis of the input shaft 62 are rotatably journaled in the housing 60. Power delivery gear members 72, 74 and 76 are coaxially mounted on output shafts 66, 68 and 70, respectively, and are rotatable relative thereto. The gear members 72 and 74 are in continuous meshing engagement with the pinion gear 64 on input shaft 62 and rotate therewith. The gear member 76 is in meshing engagement with the gear member 74 for rotation therewith and therefore rotates as the pinion 64 on the input shaft 62 rotates. One face of the gear members 72, 74 and 76 supports or is integral with a clutch member 78, 80 and 82, respectively, which are fixed for rotation with their respective gear members. A second mating clutch member 84, 86 and 88 is keyed to and slidably mounted on the output shafts 66, 68 and 70, respectively, so as to be axially movable relative to the shafts and rotatable therewith. Each set of clutch members 78–84, 80–86, and 82–88 have a spring member 90, 92 and 94, respectively, positioned about the respective output shaft for biasing the slidable clutch member from engagement with its mating member. Three solenoids 96, 98 and 100 are mounted on a wall 102 of the housing 60 coaxially with the respective output shafts 66, 68 and 70 which extend axially through the wall 102. Each solenoid 96, 98 and 100 has an armature 104, 106 and 108, respectively, which abuts or is secured to the adjacent clutch member 84, 86 and 88, respectively, so that when each solenoid is individually energized the armature pushes the adjacent clutch member into engagement with its mating clutch member on the respective gear member by overcoming the force of their respective spring member. Thus, the output shafts are operatively connected by the clutch members, gear members and pinion 64 to input shaft 62 when their individual solenoid is energized for rotation with the input shaft.

A worm gear 110 is secured to output shaft 70 and is in meshing engagement with a pair of parallel racks 112, 113 formed on opposite sides of an aperture 115 of the lower track 24. Since the housing is secured to the upper tracks 26, and the output shaft 70 is journaled in the housing, movement of worm 110 relative to racks 112, 113 will cause the upper track 26 to move relative to the lower track 24 for horizontal adjustment of the seat, supported on the upper track, relative to the vehicle floor, to which the lower track is secured.

Vertical adjustment of the seat adjuster unit is controlled by the actuation of output shafts 66, 68. Worms 114 and 116 are formed on output shaft 66, 68, respectively, between the supporting journals for the shafts in the housing 60. The worms 114, 116 are of opposite threads and in this embodiment thread 114 is left handed and thread 116 is right handed. A drive wheel 118 having an axle 120 with flanges 122 at each end has the axle 120 supported in elongated slots 124, 126 formed in each side of the housing 16 with the flanges 122 extending outside the housing. A worm gear 128 is formed on the axle 120 and is in meshing engagement with worms 114 and 116. Actuating links 52 and 40 are pivotally secured to the flange 122 by rivets 130 and 132, respectively. Vertical actuation of the seat adjuster is accomplished by rotating the drive wheel 118 in place about its axis or moving it longitudinally in the slots 124, 126 by rolling it on its periphery.

Referring now to the schematic circuit diagram shown on FIGURE 7, the reversible electric motor 8 is controlled by the front up and down switch 10, the horizontal reverse and forward switch 12 and the rear up and down switch 14, which connect the field coils of the motor 8 and solenoids with the power source 134. When the front, rear or horizontal switch is actuated to control the motor, the appropriate solenoid 96, 98 or 100 is energized to move the clutch members of the actuation mechanism 58 into engagement for transmission of power from the input shaft to the appropriate output shaft.

In describing the direction of rotation of the appropriate gears and shafts of the actuation unit, the directions will be described as though viewing the seat adjuster from the rear or from the side, as seen in FIGURES 1–3.

In operation, beginning with the seat adjuster in the fully down position, as shown in FIGURE 5, to move the front of the seat upwardly, switch 10 is moved to the "UP" position. This causes the current to flow from the power source 134 through lead 136–136a to the switch 10 and from the switch 10 through lead 138a–138 to one field of reversible electric motor 8 which drives the flexible cable 15 in a clockwise direction. The current also flows from switch 10 through lead 140 to solenoid 98, energizing the solenoid 98 thereby causing the armature 106 to move clutch member 86 into engagement with clutch member 80 which effectively connects the output shaft 68 with the input shaft 62 through pinion gear 64, gear member 74, clutch members 80–86. Thus, it can be seen that as the flexible cable 15 is driven in a clockwise direction, the input shaft 62 will be driven in a clockwise direction and the output shaft 68 and worm 116 will rotate counterclockwise. Since the other output shaft 66 is not connected with the input shaft it will remain stationary and worm 114 will act as a rack when the counterclockwise rotation of worm 116 causes the drive wheel 118 to rotate clockwise on its periphery and move to the left to a position as seen in FIGURE 4, thus effecting upward movement of the front of the seat 2 by moving control link 52 to the left and pivoting bell crank 44 clockwise about pivot pin 46.

To lower the front of the seat, switch 10 is moved to the "DOWN" position, whereby the power source 134 is connected by lead 136–136a to switch and current flows from switch 10 through lead 142–142a to the other field of reversible electric motor 8 which drives the flexible cable 15 in a counterclockwise direction. The current also flows from switch 10 through lead 140 to energize solenoid 98, connecting the input shaft 62 to the output shaft 68, as described above, so that the drive wheel 118 will now be rotated counterclockwise and rotate on its periphery to the right to a position as seen in FIGURE 5, thus returning the seat 2 to its down position.

To move the rear of the seat upwardly from the fully down position of FIGURE 5, switch 14 is moved to the "UP" position connecting the power source 134 through lead 136–136c, switch 14 to lead 138c–138 to energize the electric motor and also from the switch 14 through lead 144 to energize solenoid 96. Lead 138 energizes the motor 8 which rotates the flexible drive cable 15, input shaft 62 and pinion 64 in a clockwise direction. With solenoid 96 energized, clutch member 84 is moved by armature 104 into engagement with clutch member 78 operatively connecting gear member 72 to output shaft 66. Thus, as pinion 64 rotates clockwise, gear member 72, output shaft 66 and worm 114 will rotate counterclockwise. Such rotation of worm 114 will cause the drive wheel 118 to rotate in a clockwise direction. Since gear member 74 is not connected to output shaft 68, worm 116 will not be rotated and will act as a rack for the drive wheel 118, rotating in a clockwise direction, to move on its periphery to the right, as seen in FIGURE 6, moving actuating link 40 which pivots bell crank 34 about pivot pin 36, raising the rear of the seat 2.

To lower the rear of the seat, switch 14 is moved to the "DOWN" position, whereby the power source 134 is connected by lead 136–136c to switch 14 and current flows from switch 14 through lead 142c–142 to the other field of reversible electric motor 8 which drives the flexible cable 15 in a counterclockwise direction. The current also flows from switch 14 through lead 144 to energize solenoid 96, connecting the input shaft 62 to the output shaft 66, as described above, so that the drive wheel 118 will now be rotated counterclockwise and rotate on its periphery to the left to a position as seen in FIGURE 5, thus returning the seat 2 to its down position.

If it is desired to raise the front and rear of the seat 2 uniformly from the down position of FIGURE 5 to the up position of FIGURE 1, switches 10 and 14 are moved to the "UP" positions, connecting the power source 134 to the one field of the electric motor 8 for imparting clockwise rotation to flexible cable 15 and energizing solenoids 96 and 98, as described above. With both solenoids 96 and 98 energized, clutch members 78–84 and 80–86 effectively connect output shafts 66 and 68, respectively, to the input shaft 62 whereby as the input shaft is rotated clockwise, output shafts 66, 68 and their worms 114, 116 are rotated counterclockwise which rotates drive wheel 118 clockwise in place about its axis. Such movement of the drive wheel 118 moves the actuating links 52 and 40 from their position in FIGURE 5 to the position shown in FIGURE 1, thereby raising the front and rear of the seat 2 by pivoting bell cranks 34, 44 about their fulcrums at pivot pins 36, 46, respectively.

Switch 12 controls horizontal movement of the seat adjuster. To move the seat 2 to the rear, switch 12 is moved to the "R" or rear position. The power source 134 is connected through leads 136–136b to the switch 12, and such movement of the switch permits the current to flow from switch 12 through lead 138b–138 to the one field of the motor 8 causing clockwise rotation of the flexible cable 15. The current also flows from switch 12 through lead 146 to energize solenoid 100. When solenoid 100 is energized, the armature 108, thereof, moves clutch member 88 into engagement with clutch motor 82, thus connecting gear 76 to output shaft 70. The flexible cable 15 drives input shaft 62 and pinion 64 in a clockwise direction and through the gear train from pinion 64, to gear member 74, to gear member 76, to output shaft 70, the worm 110 is rotated in a clockwise direction and cooperating with the rack 112, 113 moves the seat 2 to the rear. When switch 12 is moved to the "F" or forward position, the other field of the motor 8 is connected to the power source through leads 136–136b and 142b–142 and the flexible cable 15 is rotated in a counterclockwise direction. Such rotation, through the gear train described above, rotates worm 110 in a counterclockwise direction and moves the seat forwardly.

Thus, it can be seen, that rotation of drive wheel 118 in place about its axis or longitudinally on its periphery will effectively move the vertical linkages to provide uniform vertical movement of the seat or tilt the seat as desired.

While but one embodiment of this invention has been illustrated, it is not intended to limit this invention in any way other than by the limits of the following claims.

I claim:

1. In a vehicle seat adjuster assembly, a seat, a movable support fixed to said seat, a reversible motor, a pair of spaced fixed supports, a rotatable wheel, linkages pivotally connected to said fixed supports, to said movable seat support and to said wheel, respectively, a gear unit including a power input shaft driven by said motor and a pair of power delivery shafts, a power input gear driven by said power input shaft, a power delivery gear on each of said power delivery shafts, respectively, in mesh with said power input gear and rotatable with respect to said power delivery shafts, respectively, selectively operable clutches for clutching said power delivery gears to said power delivery shafts, respectively, for rotating said power delivery shafts individually or together when said power input gear is rotated by said motor, and worms on said power delivery shafts, respectively, in mesh with said rotatable wheel for rotating said wheel in place when said power delivery shafts are rotated together and for rotating said wheel lineally on its perimeter when one of said power delivery shafts is rotated by itself, such movement of said wheel adjusting said seat by moving said linkages.

2. In a combination with a vehicle seat, a seat adjuster for supporting said seat on a vehicle floor and adjusting said seat relative to said floor, said seat adjuster having a front vertical linkage and a rear vertical linkage for adjusting said seat vertically relative to said floor upon movement of said linkages, and an actuating means for moving said linkages to adjust said seat, said actuating means including a drive wheel pivotally connected to said linkages for moving said linkages upon movement of said drive wheel, a drive gear secured on said drive wheel for movement therewith, a first worm and a second worm in mesh with said drive gear for moving said drive wheel when said worms are rotated, said worms having parallel axes of rotation and being spaced 180° from each other about said drive gear in meshing engagement with said drive gear, and power means connectable to said worms individually and jointly for rotating said worms, said drive wheel rotating in place when said worms are rotated jointly and said drive wheel moving lineally on one worm when the other worm is rotated individually.

3. In combination with a vehicle seat, a seat adjuster for adjustably supporting said seat having a front linkage and a rear linkage for vertically adjusting said seat, an actuating device including a housing secured from movement relative to said linkages, a drive wheel rotatably and slidably mounted on said housing, said wheel being operatively connected to said linkages for actuation thereof by rotating in place and lineally sliding of said drive wheel on said housing, said drive wheel having a worm gear thereon, a pair of parallel output shafts rotatably mounted in said housing, a worm on each output shaft in meshing engagement with said worm gear on said drive wheel for rotating in place and lineally sliding said drive wheel on said housing, power means for powering said actuating device, and connecting means for selectively connecting said output shafts individually and jointly to said power means for rotation thereby.

4. In combination with a vehicle seat, a seat adjuster for adjustably supporting said seat on a vehicle floor, said adjuster having a pair of cooperating track members for adjusting said seat horizontally fore and aft relative to said floor, a front linkage and a rear linkage for individually and jointly adjusting said seat vertically relative to said floor, and an actuating device for moving one of said track members relative to the other of said track members and for adjusting said linkages, said actuating device being secured to said one of said track members and including a housing, a drive wheel rotatably and slidably supported in said housing, said wheel having a flange portion and an axle portion said axle portion having a gear thereon, said flange portion being pivotally connected to said linkages for adjusting said linkages during movement of said wheel, a multiplicity of output shafts being rotatably supported in said housing and having parallel axes of rotation, each output shaft having a first gear secured thereto and a second gear rotatably supported thereon, clutch means associated with each second gear for connecting said second gear with its respective output shaft for rotation therewith, said first gears on two of said output shafts being operably engaged with said gear on said axle portion for selectively rotating said wheel and sliding said wheel on said housing, an input shaft rotatably supported in said housing having a gear thereon in meshing engagement with said second gears on said two output shafts engaging said gear on said axle portion, and power means operably connected to said input shaft for selectively rotating said input shaft in either direction about its axis of rotation.

5. In combination with a vehicle seat mounted on a vehicle floor, a seat adjuster having a pair of front and rear vertical linkage means for independently and cooperatively moving said seat vertically relative to said floor, and a pair of slidably interconnected track members for moving said seat generally horizontal relative to said floor; an actuating means for moving said linkages and said track members including a housing secured to one of said track members, an input shaft journaled for rotation in said housing having a pinion gear secured thereon for rotation therewith, a multiplicity of output shafts journaled for rotation in said housing and spaced from said input shaft and having their axes of rotation parallel to the axis of rotation of said input shaft, a first gear member in meshing engagement with said pinion for rotation thereby and being rotatably mounted on one of said output shafts, a second gear member in meshing engagement with said pinion for rotation thereby and being rotatably mounted on a second of said output shafts, a third gear member in meshing engagement with said second gear member for rotation thereby and being rotatably mounted on a third output shaft, a clutch means for connecting each gear member with its respective output shaft for rotation therewith, each output shaft having a worm secured thereon for rotation therewith, a drive wheel slidably and rotatably mounted on said housing having a worm gear on said drive wheel in meshing engagement with said worms on said first and said second output shafts for rotation thereby and thereon, and a flanged portion operably connected to said vertical linkages for actuating said linkages for vertically adjusting said seat relative to said floor, rack members on the other of said track members in meshing engagement with said worm on said third output shaft for cooperating therewith for moving one track member relative to the other track member thereby adjusting said seat horizontally relative to said floor, and reversible power means operably connected to said input shaft for selectively rotating said input shaft in both directions about its axis.

6. In a vehicle seat adjuster assembly, a seat, a movable support fixed to said seat, a reversible motor, a pair of fixed supports, a rotatable wheel, first linkage means for connecting said wheel to said movable seat support comprising: a first bell crank lever pivotally supported on one of said fixed supports and pivotally connected to said movable seat support and a first tie link pivotally connected to said bell crank lever and said rotatable wheel, second linkage means for connecting said movable seat support to said movable wheel including a second bell crank lever pivotally connected to the other of said pair of fixed supports, a link pivotally connecting said second bell crank lever to said seat, and a tie link connecting said second bell crank lever to said rotatable wheel, gear teeth on said rotatable wheel and means for transmitting power from said motor to said rotatable wheel, said means including a power shaft driven by said motor, a power input gear driven by said shaft, a pair of power delivery shafts, power delivery gears on said power delivery shafts, respectively, in mesh with said power input gear, said power delivery gears being rotatable with respect to said power delivery shafts, selectively operable clutches for clutching said power delivery gears to said power delivery shafts, respectively, a set of teeth on said rotatable wheel, and a worm on each of said power delivery shafts in mesh with the teeth on said rotatable wheel for rotating said wheel in place and for rotating said wheel for longitudinal movement between said fixed supports whereby said linkage means adjust said seat.

References Cited by the Examiner
UNITED STATES PATENTS

| | | | |
|---|---|---|---|
| 1,698,446 | 1/29 | Morrow | 74—42 |
| 2,056,402 | 10/36 | Klocke | 74—38 |
| 2,920,684 | 1/60 | Fante et al. | 248—394 |
| 2,931,424 | 4/60 | Pickles | 248—394 |
| 2,949,035 | 8/60 | Harrison | 74—47 |
| 3,001,756 | 9/61 | Saffer | 248—394 |
| 3,055,627 | 9/62 | Homier | 248—393 |
| 3,081,973 | 3/63 | Arlauskas et al. | 248—393 |
| 3,125,318 | 3/64 | Lohr et al. | 248—419 |

CLAUDE A. LE ROY, *Primary Examiner.*